US012759093B2

(12) United States Patent
Manjon Fernandez et al.

(10) Patent No.: US 12,759,093 B2
(45) **Date of Patent: *Oct. 13, 2026**

(54) METHOD FOR THE MANUFACTURE OF AN ASSEMBLY BY TUNGSTEN INERT GAS (TIG) WELDING

(71) Applicant: ArcelorMittal, Luxembourg (LU)

(72) Inventors: Alvaro Manjon Fernandez, Oviedo Asturias (ES); Marcos Perez Rodriguez, Cangas del Narcea Asturias (ES); David Noriega Perez, Oviedo Asturias (ES); Christina Blanco Roldan, El Entrego Asturias (ES); Roberto Suarez Sanchez, Aviles Asturias (ES); Sivasambu Bohm, Godmanchester (GB)

(73) Assignee: ArcelorMittal, Luxembourg (LU)

( * ) Notice: Subject to any disclaimer, the term of this patent is extended or adjusted under 35 U.S.C. 154(b) by 1243 days.

This patent is subject to a terminal disclaimer.

(21) Appl. No.: 17/603,423

(22) PCT Filed: Apr. 16, 2020

(86) PCT No.: PCT/IB2020/053582

§ 371 (c)(1),
(2) Date: Oct. 13, 2021

(87) PCT Pub. No.: WO2020/212885

PCT Pub. Date: Oct. 22, 2020

(65) Prior Publication Data

US 2022/0250196 A1 Aug. 11, 2022

(30) Foreign Application Priority Data

Apr. 17, 2019 (WO) .................. PCT/IB2019/053172

(51) Int. Cl.

| | |
|---|---|
| ***B23K 35/36*** | (2006.01) |
| ***B23K 9/00*** | (2006.01) |
| ***B23K 9/173*** | (2006.01) |
| ***B23K 9/235*** | (2006.01) |
| ***B23K 35/32*** | (2006.01) |
| ***B23K 35/38*** | (2006.01) |
| ***B23K 101/34*** | (2006.01) |
| ***B23K 103/04*** | (2006.01) |
| ***C09D 1/00*** | (2006.01) |
| ***C09D 5/08*** | (2006.01) |

(52) U.S. Cl.

CPC ........ *B23K 35/3608* (2013.01); *B23K 9/0026* (2013.01); *B23K 9/173* (2013.01); *B23K 9/235* (2013.01); *B23K 35/32* (2013.01); *B23K 35/383* (2013.01); *C09D 1/00* (2013.01); *C09D 5/08* (2013.01); *B23K 2101/34* (2018.08); *B23K 2103/04* (2018.08)

(58) Field of Classification Search

None

See application file for complete search history.

(56) References Cited

U.S. PATENT DOCUMENTS

| | | | | |
|---|---|---|---|---|
| 3,393,102 | A | 7/1968 | Carrol et al. | |
| 3,624,345 | A | 11/1971 | Armstrong | |
| 5,183,991 | A | 2/1993 | Arai et al. | |
| 5,236,517 | A | 8/1993 | Findlan et al. | |
| 5,368,947 | A | 11/1994 | Denney et al. | |
| 5,804,792 | A | 9/1998 | Paskell et al. | |
| 6,312,812 | B1 | 11/2001 | Hauser et al. | |
| 6,664,508 | B1 * | 12/2003 | Johnson | B23K 35/362 219/136 |
| 6,815,635 | B2 | 11/2004 | Briand et al. | |
| 2002/0125236 | A1 | 9/2002 | Moravek et al. | |
| 2003/0230559 | A1 | 12/2003 | Briand et al. | |
| 2004/0013951 | A1 | 1/2004 | Wang et al. | |
| 2004/0062873 | A1 | 4/2004 | Jung et al. | |
| 2006/0162817 | A1 | 7/2006 | Boger et al. | |
| 2007/0036994 | A1 | 2/2007 | Andre et al. | |
| 2010/0173087 | A1 | 7/2010 | Calla et al. | |
| 2010/0288397 | A1 | 11/2010 | Tseng | |
| 2011/0008537 | A1 | 1/2011 | Leveaux et al. | |
| 2011/0048495 | A1 | 3/2011 | Peddada | |
| 2011/0240121 | A1 | 10/2011 | Dalal et al. | |
| 2012/0234814 | A1 | 9/2012 | Tseng et al. | |
| 2014/0124482 | A1 * | 5/2014 | Katiyar | B23K 35/3608 219/137.2 |
| 2014/0313574 | A1 | 10/2014 | Bills et al. | |
| 2015/0027993 | A1 | 1/2015 | Bruck et al. | |
| 2015/0115511 | A1 | 4/2015 | Lindgren et al. | |

(Continued)

FOREIGN PATENT DOCUMENTS

| | | |
|---|---|---|
| CA | 2943252 C | 1/2019 |
| CN | 1475325 | 2/2004 |

(Continued)

OTHER PUBLICATIONS

Translation of CN-103769773-A (Year: 2014).*
Translation of CN-105033506-A (Year: 2015).*
David Bergström, The Absorptance of Metallic Alloys to Nd:YAG and Nd:YLF Laser Light, Licentiate Thesis, Division of Manufacturing Systems Engineering, Department of Applied Physics and Mechanical Engineering, Lulea University of Technology, Lulea, Sweden, Lulea, Nov. 2005; 2005:89.
See Search Report of PCT/IB2020/053582 dated Dec. 5, 2020.
See Search Report of PCT/IB2020/053588 dated Dec. 5, 2020.
See Search Report of PCT/IB2020/053584 dated Nov. 5, 2020.
See Search Report of PCT/IB2020/053591 dated Nov. 5, 2020.

(Continued)

*Primary Examiner* — Elizabeth M Kerr
(74) *Attorney, Agent, or Firm* — Davidson Kappel LLC

(57) ABSTRACT

A pre-coated steel substrate coated with: —optionally, an anticorrosion coating and—a flux including at least one titanate and at least one nanoparticle chosen from: $TiO_2$, $SiO_2$, Yttria-stabilized zirconia (YSZ), $Al_2O_3$, $MoO_3$, $CrO_3$, $CeO_2$ or a mixture thereof, the thickness of the flux being between 30 and 95 μm.

21 Claims, No Drawings

(56) References Cited

U.S. PATENT DOCUMENTS

| | | | | |
|---|---|---|---|---|
| 2016/0312364 | A1 | 10/2016 | Crozes et al. | |
| 2017/0101541 | A1* | 4/2017 | Roth | C08G 77/58 |
| 2017/0145554 | A1 | 5/2017 | Shuster et al. | |
| 2017/0173744 | A1 | 6/2017 | Tseng et al. | |
| 2018/0281064 | A1 | 10/2018 | Takahashi et al. | |

FOREIGN PATENT DOCUMENTS

| | | | | | |
|---|---|---|---|---|---|
| CN | 1809440 | A | | 7/2006 | |
| CN | 1978563 | A | | 6/2007 | |
| CN | 101138815 | A | | 3/2008 | |
| CN | 101952483 | A | | 1/2011 | |
| CN | 102862004 | A | | 1/2013 | |
| CN | 103008845 | A | | 4/2013 | |
| CN | 103769773 | A | * | 5/2014 | B23K 35/3607 |
| CN | 103846577 | A | | 6/2014 | |
| CN | 104259633 | A | | 1/2015 | |
| CN | 105033506 | A | * | 11/2015 | |
| CN | 105431254 | A | | 3/2016 | |
| CN | 106312263 | A | | 1/2017 | |
| CN | 106883754 | A | | 6/2017 | |
| CN | 106994548 | A | | 8/2017 | |
| CN | 109023354 | | | 12/2018 | |
| CN | 109055685 | A | | 12/2018 | |
| CN | 109604868 | A | | 4/2019 | |
| EP | 1980357 | A1 | | 10/2008 | |
| JP | S56160894 | A | | 12/1981 | |
| JP | S6120688 | A | | 1/1986 | |
| JP | S63177987 | A | | 7/1988 | |
| JP | H03165994 | A | | 7/1991 | |
| JP | H07118757 | A | | 5/1995 | |
| JP | H07214369 | A | | 8/1995 | |
| JP | H07278844 | A | | 10/1995 | |
| JP | H0885819 | A | | 4/1996 | |
| JP | 2001262368 | A | | 9/2001 | |
| JP | 2002120088 | | | 4/2002 | |
| JP | 2004351498 | A | | 12/2004 | |
| JP | 2008038188 | A | | 2/2008 | |
| JP | 2010005696 | A | | 1/2010 | |
| JP | 2016135905 | A | | 7/2016 | |
| JP | 2018135585 | A | | 8/2018 | |
| KR | 1020080061402 | | | 7/2008 | |
| WO | WO 00/16940 | A2 | | 3/2000 | |
| WO | WO0059674 | A1 | | 10/2000 | |
| WO | WO02/081142 | | | 10/2002 | |
| WO | WO 2007002017 | A1 | | 1/2007 | |
| WO | WO 2008/056371 | A1 | | 5/2008 | |
| WO | WO 2020/212887 | A1 | | 10/2020 | |
| WO | WO 2020/212889 | A1 | | 10/2020 | |
| WO | WO 2020/212891 | A1 | | 10/2020 | |
| WO | WO2020212885 | A1 | | 10/2020 | |

OTHER PUBLICATIONS

Chen Cuixin et al., “Effects if Nano-Oxide Alloying on the Microstructure and Properties of Deposited Metal of Low-Alloy High-Strength Steel,” Transactions of the China Welding Institution, Journal of Welding, vol. 37, Issue 9, Sep. 2016.

Chen Cuixin et al., “Effects if Nano-Oxide Alloying on the Microstructure and Properties of Deposited Metal of Low-Alloy High-Strength Steel,” Transactions of the China Welding Institution, Journal of Welding, vol. 37, Issue 9, Sep. 2016, see English Abstract.

* cited by examiner

METHOD FOR THE MANUFACTURE OF AN ASSEMBLY BY TUNGSTEN INERT GAS (TIG) WELDING

The present invention relates to a pre-coated steel substrate wherein the coating comprises at least one titanate and at least one nanoparticle, a method for the manufacture of an assembly; a method for the manufacture of a coated metallic substrate and finally a coated metallic substrate. It is particularly well suited for construction and automotive industries.

BACKGROUND

It is known to use steel parts to produce vehicles. Usually, the steel parts can be made of high strength steel sheets to achieve lighter weight vehicle bodies and improve crash safety. The manufacture of steel parts is generally followed by the welding of the steel part with another metallic substrate. The welding of two metallic substrates can be difficult to achieve since there is not a deep weld penetration in steel substrates. This makes it necessary to have several welding passes, which compromises productivity.

Sometimes, steel parts are welded by Gas tungsten arc welding (GTAW), also known as tungsten inert gas (TIG) welding. TIG is an arc welding process that uses a non-consumable tungsten electrode to produce the weld. The weld area and electrode are protected from oxidation or other atmospheric contamination by an inert shielding gas (argon or helium), and a filler metal is normally used, though some welds, known as autogenous welds, do not require it. A constant-current welding power supply produces electrical energy, which is conducted across the arc through a column of highly ionized gas and metal vapors known as a plasma.

The patent application WO00/16940 discloses that deep penetration gas tungsten arc welds are achieved using titanates such as $Na_2Ti_3O_7$ or $K_2TiO_3$. Titanate is applied to the weld zone in a carrier fluid paste or as part of a wire filler to afford deep penetration welds in carbon, chrome-molybdenum, and stainless steels as well as nickel-based alloys. To control arc wander, bead consistency, and slag and surface appearance of the weldments, various additional components may be optionally added to the titanate flux including transition metal oxides such as TiO, $TiO_2$, $Cr_2O_3$, and $Fe_2O_3$, silicon dioxide, manganese silicides, fluorides and chlorides. In addition, it is disclosed that a flux of titanium oxides, $Fe_2O_3$ and $Cr_2O_3$ affords weld penetration in carbon steels and nickel-based alloys but with some heat-to-heat variation.

The patent application discloses that the titanate compounds typically are used in the form of high-purity powders of about 325 mesh or finer, 325 mesh corresponding to 44 μm. The requisite amount of titanate in a particular composition should be sufficient to afford a thin open or closed coating of a 325 mesh titanate when all other components are removed. The compounds of the flux have all dimensions of micrometers.

SUMMARY OF THE INVENTION

Although the penetration is improved with the flux discloses in WO00/16940, the penetration is not optimum for steel substrates.

Thus, there is a need to improve the weld penetration in steel substrates and therefore the mechanical properties of a welded steel substrates. There is also a need to obtain an assembly of at least two metallic substrates welded together by TIG welding, said assembly comprising a steel substrate.

The present invention provides a pre-coated steel substrate coated with:

- optionally, an anticorrosion coating and
- a flux comprising at least one titanate and at least one nanoparticle chosen from: TiO2, SiO2, Yttria-stabilized zirconia (YSZ), Al2O3, MoO3, CrO3, CeO2 or a mixture thereof, the thickness of the flux being between 30 and 95 μm.

The pre-coated steel substrate according to the invention may also have the optional features listed below, considered individually or in combination:

- the flux comprises at least one titanate chosen from among: $Na_2Ti_3O_7$, $K_2TiO_3$, $K_2Ti_2O_5$ $MgTiO_3$, $SrTiO_3$, $BaTiO_3$, and $CaTiO_3$, $FeTiO_3$ and $ZnTiO_4$ or a mixture thereof,
- the flux further comprises an organic solvent,
- the percentage of nanoparticle(s) is below or equal to 80 wt. %,
- the percentage of titanate(s) is above or equal to 45 wt. %,
- the anti-corrosion coating layer(s) include a metal selected from the group consisting of zinc, aluminum, copper, silicon, iron, magnesium, titanium, nickel, chromium, manganese and their alloys,
- the diameter of the at least one titanate is between 1 and 40 μm.

The invention also relates to a method for the manufacture of the pre-coated steel substrate comprising the successive following steps:

A. The provision of a steel substrate,
B. The deposition of the flux according to the invention,
C. Optionally, the drying of the coated metallic substrate obtained in step B).

The method according to the invention may also have the optional features listed below, considered individually or in combination:

- the deposition of the flux is performed by spin coating, spray coating, dip coating or brush coating,
- in step B), the flux comprises from 1 to 200 g/L of nanoparticle(s),
- the flux comprises from 100 to 500 g/L of titanate.

The invention also relates to a method for the manufacture of an assembly comprising the following successive steps:

I. The provision of at least two metallic substrates wherein at least one metallic substrate is the pre-coated steel substrate according to the invention,
II. The welding of at least two metallic substrates by tungsten inert gas (TIG) welding.

The method according to the invention may also have the optional features listed below, considered individually or in combination:

- the TIG welding is performed with a shielding gas being an inert gas,
- the electric current of the welding machine is between 10 and 200 A.

The invention also relates to an assembly of at least two metallic substrates at least partially welded together through tungsten inert gas (TIG) welding obtainable from the method according to the invention, said assembly comprising:

- at least one steel substrate coated with optionally an anticorrosion coating and
- a welded zone comprising the dissolved and/or precipitated flux comprising at least one titanate and at least one nanoparticle chosen from: $TiO_2$, $SiO_2$, Yttria-stabilized zirconia (YSZ), $Al_2O_3$, MoO3, $CrO_3$, $CeO_2$ or a mixture thereof.

The assembly according to the invention may also have the optional features listed below, considered individually or in combination:

the second metallic substrate is a steel substrate or an aluminum substrate, the second metallic substrate is a pre-coated steel substrate according to the invention.

Finally, the invention relates to the use of an assembly obtainable from the method according to the invention for the manufacture of piping elements and parts of structures.

DETAILED DESCRIPTION

The following terms are defined:

Nanoparticles are particles between 1 and 100 nanometers (nm) in size.

Titanate refers to inorganic compounds whose composition combines a titanium oxide with at least one other oxide. They can be in the form of their salts.

"coated" means that the steel substrate is at least locally covered with the flux. The covering can be for example limited to the area where the steel substrate will be welded. "coated" inclusively includes "directly on" (no intermediate materials, elements or space disposed therebetween) and "indirectly on" (intermediate materials, elements or space disposed therebetween). For example, coating the steel substrate can include applying the flux directly on the substrate with no intermediate materials/elements therebetween, as well as applying the flux indirectly on the substrate with one or more intermediate materials/elements therebetween (such as an anticorrosion coating).

Without willing to be bound by any theory, it is believed that the flux mainly modifies the melt pool physics of the steel substrate allowing a deeper melt penetration. Contrary to the patent application WO00/16940 wherein the titanate compound is the essential component to improve the weld penetration, it seems that, in the present invention, not only the nature of the particles, but also the size of the particles being equal or below 100 nm improve the penetration thanks to the keyhole effect caused by the depression of the surface of the melt pool, the reverse Marangoni effect, the arc constriction and an improvement of arc stability.

Indeed, the titanate mixed with the specific nanoparticles allows for a keyhole mode due to the combined effects of the reverse Marangoni flow and of the constriction of the arc by electrical insulation, resulting in higher current density and an increase in weld penetration. The keyhole effect refers to a literal hole, a depression in the surface of the melt pool, which allows the energy beam to penetrate even more deeply. Energy is delivered very efficiently into the joint, which maximizes weld depth and increases weld depth to width ratio, which in turn limits part distortion.

Moreover, the flux reverses the Marangoni flow, which is the mass transfer at the liquid-gas interface due to the surface tension gradient. In particular, the components of the flux modify the gradient of surface tension along the interface. This modification of surface tension results in an inversion of the fluid flow towards the center of the weld pool, which in this case results in improvements in the weld penetration and in the wettability. Without willing to be bound by any theory, it is believed that the nanoparticles dissolve at lower temperature than microparticles and therefore more oxygen is dissolved in the melt pool, which activates the reverse Marangoni flow.

Additionally, it has been observed that the nanoparticles improve the homogeneity of the applied flux by filling the gaps between the microparticles. It helps stabilizing the welding arc, thus improving the weld penetration and quality.

Preferably, the nanoparticles are $SiO_2$ and $TiO_2$, and more preferably a mixture of $SiO_2$ and $TiO_2$. Without willing to be bound by any theory, it is believed that $SiO_2$ mainly helps in increasing the penetration depth and the slag removal and detaching while $TiO_2$ mainly helps in increasing the penetration depth and alloying with steel to form Ti-based inclusions which improve the mechanical properties.

Preferably, the nanoparticles have a size comprised between 5 and 60 nm.

Preferably, the percentage in dry weight of the nanoparticles is below or equal to 80% and preferably between 2 and 40%. In some cases, the percentage of nanoparticles may have to be limited to avoid a too high refractory effect. The person skilled in the art who knows the refractory effect of each kind of nanoparticles will adapt the percentage case by case.

The nanoparticles are not selected among sulfides or halides which are detrimental for carbon steels.

Preferably, the titanate has a particle size distribution between 1 and 40 μm, more preferably between 1 and 20 μm and advantageously between 1 and 10 μm. Indeed, without willing to be bound by any theory, it is believed that this titanate diameter further improves the depression of the surface of the melt pool, the arc constriction and the reverse Marangoni effect.

Preferably, the flux comprises at least one kind of titanate chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ or a mixture thereof. More preferably, the titanate is $MgTiO_3$. Indeed, without willing to be bound by any theory, it is believed that these titanates further increase the penetration depth based on the effect of the reverse Marangoni flow.

Preferably, the percentage in dry weight of the at least one titanate is above or equal to 45% and for example of 50 or of 70%.

According to one variant of the invention, once the flux is applied on the steel substrate and dried so that it is a coating, the coating consists of at least one titanate and at least one nanoparticle chosen from: $TiO_2$, $SiO_2$, Yttria-stabilized zirconia (YSZ), $Al_2O_3$, $MoO_3$, $CrO_3$, $CeO_2$ or a mixture thereof.

According to another variant of the invention, the coating further comprises at least one binder embedding the titanate and the nanoparticles and improving the adhesion of the flux on the steel substrate. Preferably, the binder is purely inorganic, notably to avoid fumes that an organic binder could possibly generate during welding. Examples of inorganic binders are sol-gels of organofunctional silanes or siloxanes. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Amino-alkyl silanes are particularly preferred as they are greatly promoting the adhesion and have a long shelf life. Preferably, the binder is added in an amount of 1 to 20 wt % of the dried flux.

Preferably, the steel substrate is carbon steel.

Preferably, the anti-corrosion coating includes a metal selected from the group consisting of zinc, aluminum, copper, silicon, iron, magnesium, titanium, nickel, chromium, manganese and their alloys.

In a preferred embodiment, the anti-corrosion coating is an aluminum-based coating comprising less than 15% Si, less than 5.0% Fe, optionally 0.1 to 8.0% Mg and optionally 0.1 to 30.0% Zn, the remainder being Al. In another preferred embodiment, the anti-corrosion coating is a zinc-based coating comprising 0.01-8.0% Al, optionally 0.2-8.0% Mg, the remainder being Zn.

The anti-corrosion coating is preferably applied on at least one side of the steel substrate.

The invention also relates to a method for the manufacture of the pre-coated metallic substrate, comprising the successive following steps:

A. The provision of a steel substrate according to the present invention,

B. The deposition of the flux according to the present invention,

C. Optionally, the drying of the coated metallic substrate obtained in step B).

Preferably, in step A), the steel substrate is carbon steel.

Preferably, in step B), the deposition of the flux is performed by spin coating, spray coating, dip coating or brush coating.

Preferably, in step B), the flux is deposited locally only. In particular, the flux is applied in the area where the steel substrate will be welded. It can be on the edge of the steel substrate to be welded or on one part of one side of the substrate to be welded. More preferably, the width of the applied flux is at least as large as the weld to be done so that the arc constriction is further improved.

Advantageously, the flux further comprises an organic solvent. Indeed, without willing to be bound by any theory, it is believed that the organic solvent allows for a well dispersed coating. Preferably, the organic solvent is volatile at ambient temperature. For example, the organic solvent is chosen from among: volatile organic solvents such as acetone, methanol, isopropanol, ethanol, ethyl acetate, diethyl ether, non-volatile organic solvents such as ethylene glycol and water.

Preferably, the flux comprises from 100 to 500 $g \cdot L^{-1}$ of titanate, more preferably between 175 and 250 $g \cdot L^{-1}$. Preferably, the flux comprises from 1 to 200 $g \cdot L^{-1}$ of nanoparticles, more preferably between 5 and 80 $g \cdot L^{-1}$.

According to one variant of the invention, the flux of step B) consists of at least one titanate, at least one nanoparticle chosen from: $TiO_2$, $SiO_2$, Yttria-stabilized zirconia (YSZ), $Al_2O_3$, $MoO_3$, $CrO_3$, $CeO_2$ or a mixture thereof and at least one organic solvent.

According to another variant of the invention, the flux of step B) further comprises a binder precursor to embed the titanate and the nanoparticles and to improve the adhesion of the flux on the steel substrate. Preferably, the binder precursor is a sol of at least one organofunctional silane. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Preferably, the binder precursor is added in an amount of 40 to 400 $g \cdot L^{-1}$ of the flux.

When a drying step C) is performed, the drying is performed by blowing air or inert gases at ambient or hot temperature. When the flux comprises a binder, the drying step C) is preferably also a curing step during which the binder is cured. The curing can be performed by Infra-Red (IR), Near Infra-Red (NIR), conventional oven.

Preferably, the drying step C) is not performed when the organic solvent is volatile at ambient temperature. Indeed, it is believed that after the deposition of the coating, the organic solvent evaporates leading to a dried flux on the metallic substrate.

The invention also relates to a method for the manufacture of an assembly comprising the following successive steps:

I. The provision of at least two metallic substrates wherein at least one metallic substrate is the pre-coated steel substrate according to the present invention and II. The welding by tungsten inert gas (TIG) welding of the at least two metallic substrates.

Preferably, in step II), the welding is performed with a shield gas being an inert gas. For example, the inert gas is chosen from helium, neon, argon, krypton, xenon or a mixture thereof. Advantageously, the inert gas comprises at least argon.

Preferably, in step II), the electric current during welding is between 10 and 300 A. The welding can be done with or without filler.

With the method according to the present invention, it is possible to obtain an assembly of at least a first metallic substrate in the form of a steel substrate optionally coated with an anticorrosion coating and a second metallic substrate, the first and second metallic substrates being at least partially welded together through tungsten inert gas (TIG) welding wherein the welded zone comprises a dissolved and/or precipitated flux comprising at least one titanate and at least one nanoparticle chosen from: $TiO_2$, $SiO_2$, Yttria-stabilized zirconia (YSZ), $Al_2O_3$, $MoO_3$, $CrO_3$, $CeO_2$ or a mixture thereof.

By "dissolved and/or precipitated flux", it is meant that components of the flux can be dragged towards the center of the liquid-gas interface of the melt pool because of the reverse Marangoni flow and can be even dragged inside the molten metal. Some components dissolve in the melt pool which leads to an enrichment in the corresponding elements in the weld. Other components precipitate and are part of the complex oxides forming inclusions in the weld.

In particular, when the Al amount of the steel substrate is above 50 ppm, the welded zone comprises inclusions comprising notably Al—Ti oxides or Si—Al—Ti oxides or other oxides depending on the nature of the added nanoparticles. These inclusions of mixed elements are smaller than 5 μm. Consequently, they do not compromise the toughness of the welded zone. The inclusions can be observed by Electron Probe Micro-Analysis (EPMA). Without willing to be bound by any theory, it is believed that the nanoparticles promote the formation of inclusions of limited size so that the toughness of the welded zone is not compromised.

Preferably, the second metallic substrate is a steel substrate or an aluminum substrate. More preferably, the second steel substrate is a pre-coated steel substrate according to the present invention.

Finally, the invention relates to the use of the coated metallic substrate according to the present invention for the manufacture of piping elements and parts of structures.

EXAMPLES

The following examples and tests are non-restricting in nature and must be considered for purposes of illustration only. They will illustrate the advantageous features of the present invention, the significance of the parameters chosen by the inventors after extensive experiments and further establish the properties that can be achieved by the invention.

For the Trials, the steel substrate having the chemical composition in weight percent disclosed in Table 1 was used:

| C | Mn | Si | Al | S | P | Cu | Ni |
|---|---|---|---|---|---|---|---|
| 0.102 | 0.903 | 0.012 | 0.04 | 0.0088 | 0.012 | 0.027 | 0.0222 |
| Cr | Nb | Mo | V | Ti | B | N | Fe |
| 0.027 | 0.0012 | 0.002 | 0.0011 | 0.0008 | 0.0001 | 0.0035 | Balance |

Example 1

For Trials 1 to 3, an acetone solution comprising $MgTiO_3$ (diameter 2 μm), $SiO_2$ (diameter range: 12-23 nm) and $TiO_2$ (diameter range: 36-55 nm) was prepared by mixing acetone with said elements. In the acetone solution, the concentration of $MgTiO_3$ was of 175 $g \cdot L^{-1}$. The concentration of $SiO_2$ was of 25 $g \cdot L^{-1}$. The concentration of $TiO_2$ was of 50 $g \cdot L^{-1}$. Then, Trials 1 to 3 were coated with different thicknesses of the acetone solution by spraying on an area wider than the weld to be done. The acetone evaporated. The percentage of $MgTiO_3$ in the coating was of 70 wt. %, the percentage of $SiO_2$ was of 10 wt. % and the percentage of $TiO_2$ was of 20 wt. %.

Trial 4 was coated with an acetone solution comprising microparticles of $MgTiO_3$ (diameter: 2 μm), $SiO_2$ (diameter: 2 μm) and $TiO_2$ (diameter: 2 μm).

Trial 5 was not coated.

Then, the TIG welding was applied on each Trial. The welding parameters are in the following Table 2:

| Electric current (A) | Speed ($mm.min^{-1}$) | Stick Out (mm) | Arc length (mm) | Gas flow: Ar ($L.min^{-1}$) | Angle electrode | Diameter electrode (mm) |
|---|---|---|---|---|---|---|
| 160 | 80 | 3 | 1 | 8 | 60 | 3.2 |

After the TIG welding, the aspect of the coating on the side of the welded area was analyzed by naked eyes and by Field Emission Gun-Scanning Electron Microscopy (FEG-SEM). Thermal images of the welding arc on the coatings were taken. The composition of the welded area was analyzed by Scanning Electron Microscope (SEM). Trials were bended until 180° according to the norm ISO 15614-7. The hardness of both Trials was determined in the center of the welded area using a microhardness tester. The composition of the welded area was analyzed by Energy Dispersive X-ray Spectroscopy and inductively coupled plasma emission spectroscopy (ICP-OES). Results are in the following Table 3:

| Trials | Dried coating thickness (μm) | Top view of the coating observed by naked eyes | Top view of the coating observed by FEG-SEM | Weld penetration | Bending 180° | Hardness in the welded area (HV) | Composition of welded area |
|---|---|---|---|---|---|---|---|
| 1 | 25 | — | — | Depth increases but no full penetration | No cracks | — | — |
| 2* | 40 | Homogenous, no delamination | $MgTiO_3$, nanoparticles of $SiO_2$ and $TiO_2$ well dispersed, homogenous | Full penetration | No cracks | 190 | MgO, $SiO_2$, $TiO_2$, $FeO_2$, Fe |
| 3 | 100 | Heterogenous, delamination around the welded zone | — | Partial penetration | No cracks | — | — |
| 4 | 40 | Heterogenous, delamination around the welded zone | Microparticles of $MgTiO_3$, SiO2, TiO2 not well dispersed, heterogenous | Partial penetration | No cracks | — | — |
| 5 | — | — | — | Partial penetration | No cracks | 180 | $FeO_2$, Fe |

*according to the present invention

Results show that Trial 2 improves the TIG welding compared to comparative Trials.

Thermal imaging also confirmed that the combination of the titanates and the specific nanoparticles increase the heat flux, leading to higher temperature in melt pool and higher gas pressure. Higher temperature in the melt pool leads to more heat transfer towards the lower area of the melt pool due to the reverse Marangoni convective flow, leading to the melting of the base metal and increasing the penetration.

Example 2

Different coatings were tested by Finite Element Method (FEM) simulations on the steel substrates. In the simulations, the flux comprises optionally $MgTiO_3$ (diameter: 2 μm) and nanoparticles having a diameter of 10-50 nm. The thickness of the coating was of 40 μm. Arc welding was simulated with each flux. Results of the Arc welding by simulations are in the following Table 4:

| | Coating composition (wt. %) | | | | |
|---|---|---|---|---|---|
| Trials | titanate | nanoparticles | | | Results |
| 6* | 50% $MgTiO_3$ | 40% $TiO_2$ | 10% YSZ | — | Homogeneous thermal profile. No formation of brittle phases. Maximum temperature in the middle of the steel. Full penetration |
| 7* | 50% $MgTiO_3$ | 15% $TiO_2$ | 35% $Al_2O_3$ | — | Homogeneous thermal profile. No formation of brittle phases. Maximum temperature in the middle of the steel. Full penetration |
| 8* | 50% $MgTiO_3$ | 15% $TiO_2$ | 35% $MoO_3$ | — | Homogeneous thermal profile. No formation of brittle phases. Maximum temperature in the middle of the steel. Full penetration |
| 9* | 50% $MgTiO_3$ | 15% $TiO_2$ | 35% $CrO_3$ | — | Homogeneous thermal profile. No formation of brittle phases. Maximum temperature in the middle of the steel. Full penetration |
| 10 | 50% $MgTiO_3$ | 15% $TiO_2$ | 35% CaO | — | High refractory effect of CaO. Arc heat in the surface of the plate. No full penetration |
| 11 | 50% $MgTiO_3$ | 15% $TiO_2$ | 35% MgO | — | High refractory effect of MgO. Arc heat in the surface of the plate. No full penetration |
| 12* | 50% $MgTiO_3$ | 15% $TiO_2$ | 35% $CeO_2$ | — | Homogeneous thermal profile. No formation of brittle phases. Maximum temperature in the middle of the steel. Full penetration |
| 13 | 50% $MgTiO_3$ | 15% $TiO_2$ | 35% $B_2O_3$ | — | Maximum arc heat in the surface of the steel. No full penetration. Formation of brittle phases |
| 14* | 70% $MgTiO_3$ | 10% $SiO_2$ | 20% $CeO_2$ | — | Homogeneous thermal profile. No formation of brittle phases. Maximum temperature in the middle of the steel. Full penetration |
| 15 | 70% $MgTiO_3$ | 30% $Cr_2O_3$ | | — | Maximum arc heat in the surface of the steel. No full penetration. Formation of brittle phases |
| 16 | 0 | 20% MgO | 70% $Co_3O_4$ | 10% $SiO_2$ | High refractory effect of MgO and $Co_3O_4$. Arc heat in the surface of the plate. No full penetration |
| 17 | 0 | 20% $MoO_3$ | 70% $CeO_2$ | 10% $SiO_2$ | No effect of the flux. No full penetration |
| 18 | 70% $MgTiO_3$ | 30% TiN | | — | No effect of the flux. No full penetration |

*according to the present invention

Results show that Trials according to the present invention improve the TIG welding compared to comparative Trials.

Example 3

For trial 19, a water solution comprising the following components was prepared: 363 $g \cdot L^{-1}$ of $MgTiO_3$ (diameter 2 μm), 77.8 $g \cdot L^{-1}$ of $SiO_2$ (diameter range: 12-23 nm), 77.8 $g \cdot L^{-1}$ of $TiO_2$ (diameter range: 36-55 nm) and 238 $g \cdot L^{-1}$ of 3-aminopropyltriethoxysilane (Dynasylan® AMEO produced by Evonik®). The solution was applied on the steel substrate and dried by 1) IR and 2) NIR. The dried coating was 40 μm thick and contained 62 wt % of $MgTiO_3$, 13 wt % of $SiO_2$, 13 wt % of $TiO_2$ and 12 wt % of the binder obtained from 3-aminopropyltriethoxysilane.

For trial 20, a water solution comprising the following components was prepared: 330 $g \cdot L^{-1}$ of $MgTiO_3$ (diameter 2 μm), 70.8 $g \cdot L^{-1}$ of $SiO_2$ (diameter range: 12-23 nm), 70.8 $g \cdot L^{-1}$ of $TiO_2$ (diameter range: 36-55 nm), 216 $g \cdot L^{-1}$ of 3-aminopropyltriethoxysilane (Dynasylan® AMEO produced by Evonik®) and 104.5 $g \cdot L^{-1}$ of a composition of organofunctional silanes and functionalized nanoscale $SiO_2$ particles (Dynasylan® Sivo 110 produced by Evonik). The solution was applied on the steel substrate and dried by 1) IR and 2) NIR. The dried coating was 40 μm thick and contained 59.5 wt % of $MgTiO_3$, 13.46 wt % of $SiO_2$, 12.8 wt % of $TiO_2$ and 14.24 wt % of the binder obtained from 3-aminopropyltriethoxysilane and the organofunctional silanes.

In all cases, the adhesion of the flux on the steel substrate was greatly improved.

What is claimed is:

1. A pre-coated steel substrate comprising:

a steel substrate; and a flux coating the steel substrate and including at least one titanate, wherein a diameter of the at least one titanate is between 1 and 40 μm, and at least one nanoparticle selected from the group consisting of: TiO2, SiO2, Yttria-stabilized zirconia (YSZ), Al2O3, MoO3, CrO3, CeO2 and mixtures thereof, a thickness of the flux being between 30 and 95 μm.

2. The pre-coated steel substrate as recited in claim 1 wherein the at least one titanate is selected from the group consisting of: Na2Ti3O7, NaTiO3, K2TiO3, K2Ti2O5, MgTiO3, SrTiO3, BaTiO3, CaTiO3, FeTiO3, ZnTiO4 and mixtures thereof.

3. The pre-coated steel substrate as recited in claim 1 wherein a percentage of the at least one nanoparticle is below or equal to 80 wt. %.

4. The pre-coated steel substrate as recited in claim 1 wherein a percentage of the at least one titanate is above or equal to 45 wt. %.

5. The pre-coated steel substrate as recited in claim 1 wherein the flux further includes a binder.

6. The pre-coated steel substrate as recited in claim 5, wherein a percentage of the binder in the pre-coating is between 1 and 20 wt. %.

7. The pre-coated steel substrate as recited in claim 1 further comprising an anti-corrosion coating.

8. The pre-coated steel substrate as recited in claim 7 wherein the anti-corrosion coating includes a metal selected from the group consisting of zinc, aluminum, copper, silicon, iron, magnesium, titanium, nickel, chromium, manganese and their alloys.

9. A method for the manufacture of the pre-coated steel substrate as recited in claim 1, comprising the successive following steps:

A. providing the steel substrate; and

B. depositing the flux including at least one titanate, wherein the diameter of the at least one titanate is between 1 and 40 μm.

10. The method as recited in claim 9 further comprising: C. drying of the coated steel substrate obtained in step B.

11. The method as recited in claim 9 wherein in step B, the deposition of the flux is performed by spin coating, spray coating, dip coating or brush coating.

12. The method as recited in claim 9 wherein in step B, the flux further includes an organic solvent.

13. The method as recited in claim 9 wherein in step B, the flux includes from 1 to 200 g/L of the at least one nanoparticle.

14. The method as recited in claim 9 wherein in step B, the flux includes from 100 to 500 g/L of the at least one titanate.

15. The method as recited in claim 9 wherein in step B, the flux further includes a binder precursor.

16. A method for the manufacture of an assembly comprising the following successive steps:

providing at least two metallic substrates wherein a first of the at least two metallic substrates is a pre-coated steel substrate coated with a flux including at least one titanate, wherein a diameter of the at least one titanate is between 1 and 40 μm, and at least one nanoparticle selected from the group consisting of: $TiO_2$, $SiO_2$, Yttria-stabilized zirconia (YSZ), $Al_2O_3$, $MoO_3$, $CrO_3$, $CeO_2$ and mixtures thereof, a thickness of the flux being between 30 and 95 μm; and welding the at least two metallic substrates by TIG welding.

17. The method as recited in claim 16 wherein the TIG welding is performed with a shielding gas being an inert gas.

18. The method as recited in claim 16 wherein an electric current of a welding machine performing the TIG welding is between 10 and 300 A.

19. An assembly of at least a first metallic substrate in the form of the pre-coated steel substrate as recited in claim 1 and a second metallic substrate, the first and second metallic substrates being at least partially welded together through TIG welding, the welded zone including the flux as a dissolved or precipitated flux.

20. The assembly as recited in claim 19 wherein the second metallic substrate is a steel substrate or an aluminum substrate.

21. The assembly as recited in claim 19 wherein the second metallic substrate is a second pre-coated steel substrate having a second steel substrate; and a second flux including at least one titanate and at least one nanoparticle selected from the group consisting of: $TiO_2$, $SiO_2$, Yttria-stabilized zirconia (YSZ), $Al_2O_3$, $MoO_3$, $CrO_3$, $CeO_2$ and mixtures thereof, a thickness of the second flux being between 30 and 95 μm.

* * * * *